(12) United States Patent
Hagerdorn

(10) Patent No.: US 8,998,769 B2
(45) Date of Patent: Apr. 7, 2015

(54) PLANETARY GEAR SET HAVING AN ANTI-TURN MECHANISM

(75) Inventor: Heinz Gert Hagerdorn, Rottweil (DE)

(73) Assignee: IMS Gear GmbH, Donaueschingen (DE)

( * ) Notice: Subject to any disclaimer, the term of this patent is extended or adjusted under 35 U.S.C. 154(b) by 193 days.

(21) Appl. No.: 13/697,260

(22) PCT Filed: May 5, 2011

(86) PCT No.: PCT/EP2011/002240
§ 371 (c)(1),
(2), (4) Date: Jan. 9, 2013

(87) PCT Pub. No.: WO2011/141140
PCT Pub. Date: Nov. 17, 2011

(65) Prior Publication Data
US 2013/0116082 A1    May 9, 2013

(30) Foreign Application Priority Data
May 12, 2010   (DE) .......................... 10 2010 020 414

(51) Int. Cl.
*F16H 57/10* (2006.01)
*F16D 1/08* (2006.01)
*F16H 57/025* (2012.01)
*F16H 57/08* (2006.01)

(52) U.S. Cl.
CPC .............. *F16H 57/10* (2013.01); *F16D 1/0876* (2013.01); *F16H 57/025* (2013.01); *F16H 57/08* (2013.01)

(58) Field of Classification Search
CPC ....................................................... F16H 57/10
USPC .................................................... 475/331, 344
See application file for complete search history.

(56) References Cited

U.S. PATENT DOCUMENTS

| 4,517,858 A | * | 5/1985 | Schafer ........................ 475/337 |
| 4,651,580 A |  | 3/1987 | Deane |
| 5,785,624 A | * | 7/1998 | Mayr ............................ 475/252 |
| 7,438,663 B2 | * | 10/2008 | Osborn et al. ................ 475/344 |

FOREIGN PATENT DOCUMENTS

| DE | 32 44 991 | 3/1984 |
| DE | 32 44 991 C1 | 3/1984 |
| DE | 692 08 610 T2 | 9/1996 |
| DE | 198 53 459 A1 | 6/2000 |
| DE | 198 53 459 | 11/2005 |
| EP | 0 247 961 | 2/1987 |
| EP | 0 247 961 A2 | 12/1987 |

* cited by examiner

*Primary Examiner* — Edwin A Young
(74) *Attorney, Agent, or Firm* — Todd L. Juneau

(57) ABSTRACT

The invention relates to a planetary gear set having an anti-turn mechanism, comprising a sun fear and at least one planet gear revolving in a fear housing having an internal toothing, wherein the gear housing is connected to at least one bearing flange on the output side and/or on the input side, and for the anti-turn connection to the gear housing, toothing means are provided which engage with the internal toothing. According to the invention at least one tooth segment is provided as a toothing means, the tooth segment comprises a tooth segment body, and the bearing flange has an opening for positively receiving the tooth segment body.

7 Claims, 4 Drawing Sheets

PLANETARY GEAR SET HAVING AN ANTI-TURN MECHANISM

CROSS REFERENCE TO RELATED APPLICATIONS

The present application claims priority International Application PCT/EP2011/002240 filed on May 5, 2011, and thereby to German Patent Application No. 10 2010 020 414.5, filed on May 12, 2010.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

FIELD OF THE INVENTION

The function of planetary gear sets are known per se. A sun gear is located in the center, which is driven by an engine and connected via an engine flange to the planetary gear. The run gear transfers its motion to at least three circulating planetary gears forming a gear speed, arranged on bearing pins of a planet carrier. In case of several gear speeds the last planet carriers are connected to a driven shaft in a fixed manner and this way ensures the transmission of force at the output side. At the exterior, the planetary gears travel in a gear housing with internal toothing, the so-called annulus gear. Further, the transmission housing is connected at the output side with an output flange.

Due to the torque to be transmitted inside the planetary gear the parts axially clamped to each other only via a screw-connection, such as an engine flange, gear housing, and output flange, tend to distort in reference to each other depending on the direction of load.

In order to form an anti-turn mechanism it is known to form the engine and output flange with a spline (also called press-toothing), which during the assembly engages the sprocket of the gear housing. However, here it is disadvantageous that such flanges originally have to be formed in one piece by way of zinc die-casting or by plastic injection molding in order to ensure an economic production process. Due to the fact that the tolerances achievable in die casting are excessive, here post-processing is necessary, e.g., via a lathe or a miller, in order to introduce the tip of the ball bearing or the threads into the bearing flanges, for example. This leads to the production of such bearing flanges being expensive and costly and additionally very inflexible, so that particularly such procedures are unsuitable for the production of prototypes or other small-scale series.

The objective of the invention is to provide a planetary gear with flexible production efficiencies, capable of being realized easily and cost-effectively.

BACKGROUND

Disclosed herein is a planetary gear with an anti-turn mechanism comprising a sun gear and at least one planetary gear circulating in a gear housing with an internal toothing and in which the gear housing is connected at the input and/or the output side with at least one bearing flange, and with the gear housing being provided with toothing means as an anti-turn mechanism, which engage the internal toothing, it is provided according to the invention that at least one tooth segment is provided as an engaging means, with the tooth segment comprising a tooth segment body and the bearing flange comprising a recess for a form-fitting engagement by the tooth segment body.

A planetary gear with such configuration will allow both increased flexibility in production as well as cost efficiency in manufacturing compared to gears currently known.

SUMMARY OF THE INVENTION

An object of the present invention is to provide a planetary gear with an anti-turn mechanism with features enabling increased flexibility in production and cost efficiency not available in currently disclosed gear assemblies.

In a preferred embodiment, a planetary gear set having an anti-turn mechanic, comprising a sun gear and at least one planet gear circulating in a gear housing with internal toothing, with the gear housing being connected to at least one bearing flange at the output and/or the input side, and with toothing means being provided for a torque-proof connection to the gear housing, which engage the internal toothing, wherein at least one tooth segment is provided as a toothing means, the toothing segment comprises a tooth segment body, and the bearing flange shows a recess for a form-fitting acceptance of the tooth segment body.

The planetary gear set as disclosed, further comprising wherein the tooth segment is embodied with an arc-shaped tooth carrier supporting the teeth of the tooth segment.

The planetary gear set as disclosed, further comprising wherein the tooth segment body is embodied plate-shaped in the radial direction with a first and second primary area, with the tooth carrier being arranged on the first primary area with a facial area of the tooth segment extending perpendicularly in reference thereto.

The planetary gear set as disclosed, further comprising wherein the second primary area of the tooth segment body comprises a pin formed thereon, which is accepted by a bore arranged in the bearing flange.

The planetary gear set as disclosed, wherein the bearing flange comprises an annular shoulder at the side of the gear housing, and the tooth segment is arranged in a groove extending radially in the area of the annular shoulder with a groove width adjusted to the arc length of the tooth segment such that the shoulder is aligned to the tooth base of the tooth segment.

The planetary gear set as disclosed, further comprising wherein the width of the shoulder of the tooth width of the teeth is equivalent to the tooth segment.

The planetary gear set as disclosed, further comprising wherein the end section of the groove forms the recess for the tooth segment and the groove shows a depth such that the first primary area of the tooth segment body is aligned to the facial area of the bearing flange at the side of the gear housing.

The planetary gear set as disclosed, further comprising wherein a threaded bore is inserted into the bearing flange in the edge region of the tooth segment body which leads to a partial bore in the edge region of the tooth segment body.

The planetary gear set as disclosed, further comprising wherein two diametrically opposite tooth segments are arranged on the bearing flange.

BRIEF DESCRIPTION OF THE DRAWINGS

These and other features of the invention will become more apparent in the following detailed description in which reference is made to the appended drawings.

DETAILED DESCRIPTION OF THE INVENTION

Figure 1:
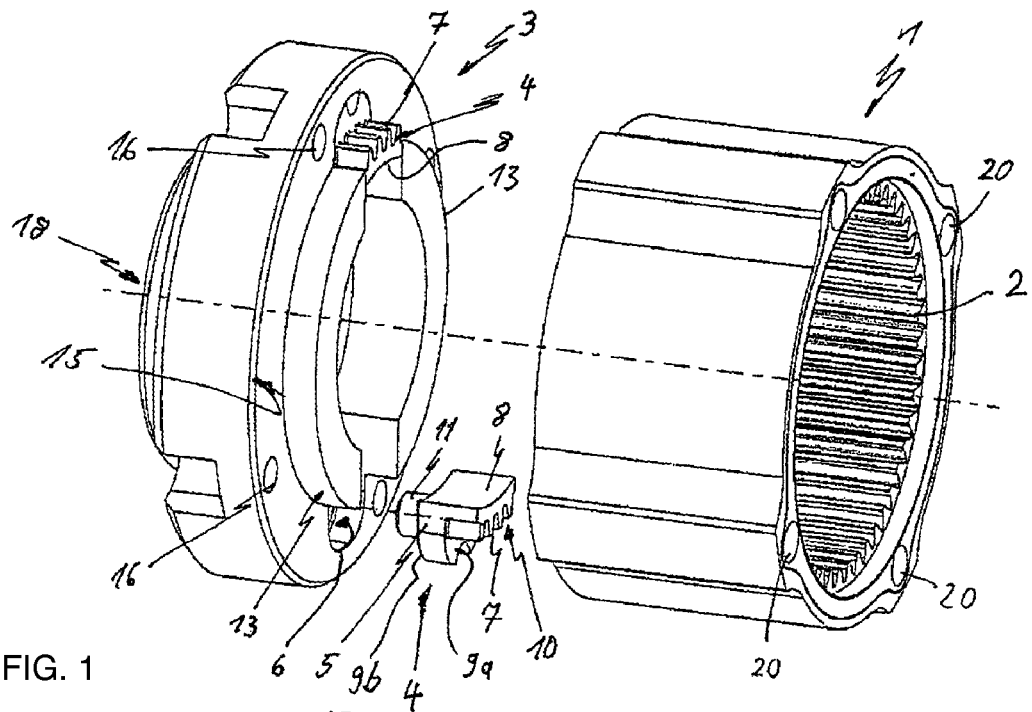
FIG. 1 an exploded illustration of an output flange with tooth segments according to the invention and a gear housing with internal toothing as an exemplary embodiment of the invention, FIG. 2 a cross-section of the output flange with a gear housing according to FIG. 1, FIG. 3 a perspective illustration of the output flange according to FIG. 1 with a tooth segment according to the invention, FIG. 4 a perspective illustration of the tooth segment according to the invention, FIG. 5 a cross-section of an engine flange connected to a gear housing with a tooth segment according to the invention according to FIG. 4 as another exemplary embodiment, FIG. 6 a cross-section according to a line I-I in FIG. 5, and FIG. 7 a perspective illustration of the engine flange according to FIG. 6 with a tooth segment according to the invention.

Unless defined otherwise, all technical and scientific terms used herein have the same meaning as commonly understood by one of ordinary skill in the art to which this invention belongs.

Disclosed herein is a planetary gear with an anti-turn mechanism comprising a sun gear and at least one planetary gear circulating in a gear housing with an internal toothing and in which the gear housing is connected at the input and/or the output side with at least one bearing flange, and with the gear housing being provided with toothing means as an anti-turn mechanism, which engage the internal toothing, it is provided according to the invention that at least one tooth segment is provided as an engaging means, with the tooth segment comprising a tooth segment body and the bearing flange comprising a recess for a form-fitting engagement by the tooth segment body.

With this solution according to the invention, the originally used spline is reduced to a single tooth segment, which can be produced independently from the geometry and the material of the actual bearing flange. The assembly of such a tooth segment according to the invention is extremely simple because the separately produced tooth segment is inserted into the prepared recess. In spite of this simple solution, a form-fitting connection is yielded between the bearing flange and the internal toothing, and thus the sprocket of the gear housing, so that a mutual distortion of these parts is reliably prevented.

This allows that by this solution according to the invention, bearing flanges can be produced with an arbitrary contour. The necessary recess for the tooth segment can be inserted easily via conventional power drills or cutting machines.

Further, such bearing flanges can be produced from arbitrary materials regardless of the original plasticity of the material.

The solution according to the invention now allows a cost-effective production of small and ultra-small series of planetary gears, because the expensive post-processing of the die-cast part is omitted and additionally expensive casting molds required for different forms of flanges are no longer necessary.

In a further development of the invention, the toothed segment is embodied with an arc-shaped tooth carrier comprising the teeth of the tooth segment so that only a small structural space is required inside the gear housing, which leads to a compact design of the planetary gear.

Further, according to a particularly advantageous embodiment of the invention the gear segment body is embodied plate-shaped in the radial direction, showing a first and second primary area, with the tooth carrier on the first primary area being arranged with a facial area of the tooth segment extending perpendicular in reference thereto. This way, a reliable anchoring of the tooth segment can be realized in the bearing flange.

According to another embodiment of the invention an additional fixation of the tooth segment in the bearing flange can be achieved such that the second primary area of the tooth segment body comprises a pin arranged thereon, which is accepted by a bore arranged in the bearing flange. Such a pin also facilitates the assembly of the tooth element.

Advantageously the bearing flange according to a further development of the invention comprises an annular shoulder at the side of the gear housing, with the tooth segment being arranged in a groove extending radially in the area of the annular shoulder, with a groove width adjusted to the arc length of the tooth element such that the shoulder is aligned to the tooth base of the tooth segment and preferably its width being equivalent to the tooth width of the teeth of the tooth segment.

Such a groove can easily be produced as a recess matching the shape of the tooth segments. The tooth segment body is guided by the groove walls, preferably the end section of the groove forms a recess for the tooth element so that the facial side of the groove and the form of the tooth segment body can be adjusted to each other, with a semi-circular form being beneficial for reasons of technical production.

Further, this facilitates the assembly of the tooth segment, because it only needs to be inserted into this groove, with simultaneously the pin of the tooth segment body being inserted into the bore provided in the base of the groove. Furthermore, due to the shoulder the assembly of the bearing flange at the gear housing is also facilitated by a simple placement onto said shoulder.

The groove depth is equivalent to the thickness of the tooth segment body so that the first primary area of the tooth segment body is aligned to the face of the bearing flange at the side of the gear housing. This way, the gear housing can be connected to the bearing flange in a form-fitting fashion.

In order to secure the position of the tooth segment according to the invention it is particularly advantageous if, according to a further development of the invention, a threaded bore is inserted into the bearing flange in the edge region of the tooth segment body, which leads to a partial bore in the edge region of the tooth segment body. This partial bore leads to an additional fixation of the tooth segment in the bearing flange.

Finally, it has been shown that two tooth segments arranged on the bearing flange and diametrically opposite each other are sufficient for reliable torque-proofing.

DESCRIPTION OF THE FIGURES

Turning now to the Figures, identical components of the same exemplary embodiments of the terminal are marked in all figures with the same reference characters, unless indicated otherwise. Further, individual features illustrated based on different exemplary embodiments can be freely combined unless they contradict each other.

The following comprises a listing of parts and associated parts numbers, as used in the Figures described herein beneath:
1 Gear housing
2 Internal toothing, sprocket
3 Bearing flange, output flange, engine flange
4 Tooth segment
5 Tooth segment body
6 Recess in the bearing flange 3
7 Teeth of the tooth segment 4
8 Tooth carrier of the tooth segment
9a first primary area of the tooth segment body 5
9b second primary area of the tooth segment body 5
10 facial area of the tooth segment 4
11 pin at the tooth segment body 5
12 bore in the bearing flange 3
13 shoulder at the bearing flange 3
14 groove in the bearing flange 3
15 facial areas of the bearing flange 3
16 threaded bore in the bearing flange 3
17 partial bore in the tooth segment body 5
18 central bore of the bearing flange 3
19 facial area of the tooth segment body 5
20 bore in the gear housing 1
21 tooth base of the teeth 7 of the tooth segment 4
22 groove width
23 arc length of the tooth segment 4
24 depth of the groove 14

Figure 2:
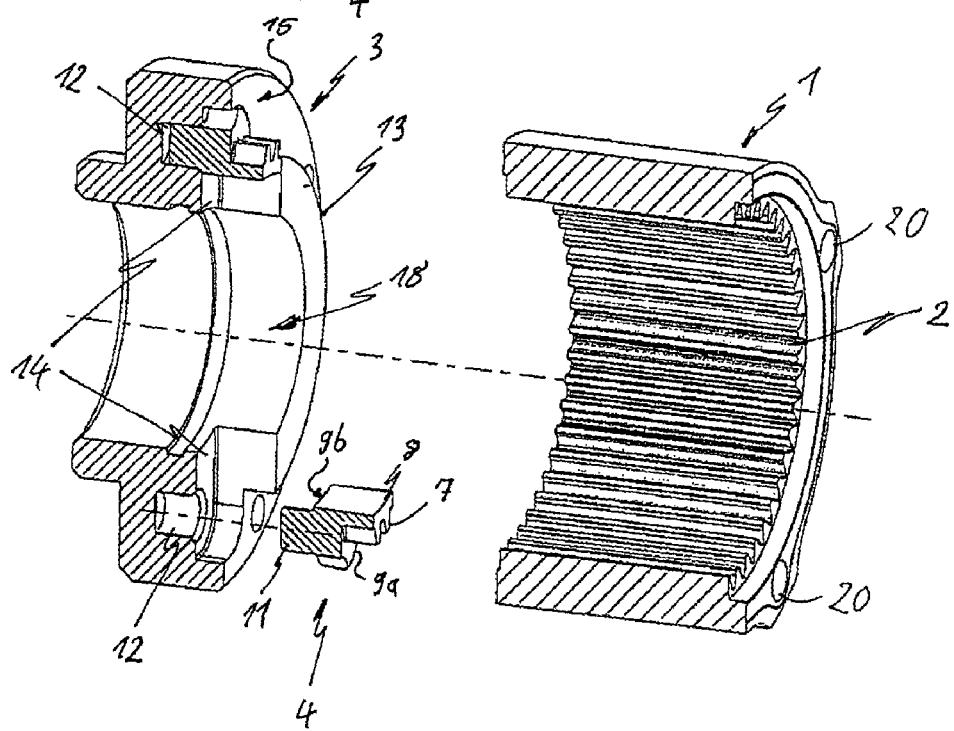
Figure 5:
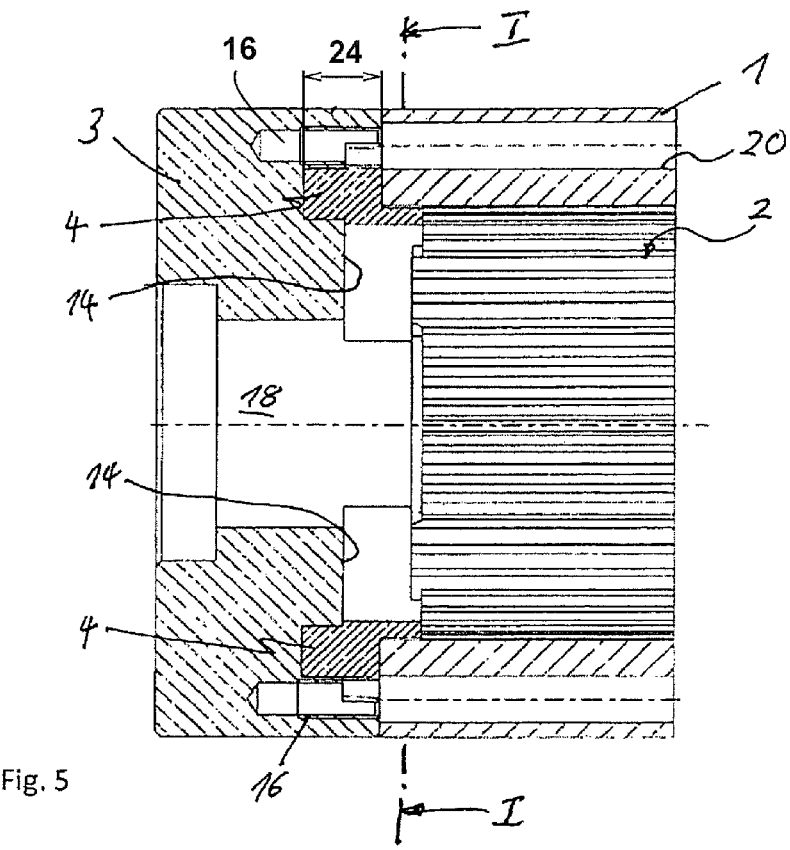

FIGS. 1 and 2 only show a gear housing 1 with a sprocket 2 as the internal toothing and a bearing flange 3 as components of the planetary gear. The bearing flange 3 according to FIGS. 1 and 2 is embodied e.g., as an output flange, and is connected via a screw-connection to the gear housing 2, as shown in FIG. 5 for example. On the opposite facial side of the gear housing 1a bearing flange is assembled as well (not shown in FIGS. 1, 2), in this case an engine flange. This gear housing 1 accepts a planet carrier (not shown), carrying the planetary gears as well as the sun gear (not shown) driven by a drive.

The input and output side bearing flanges show a similar annular design, so that a centered bore accepts either the drive axis for the sun gear or the output axis connected to a planet carrier.

Figure 3:
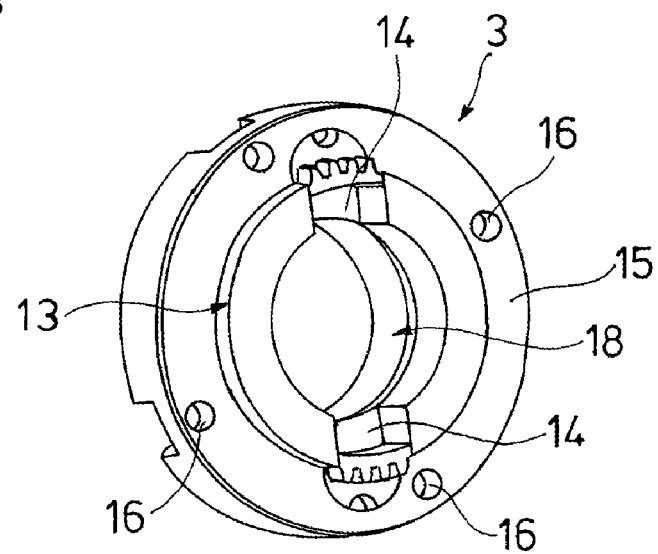
Figure 4:
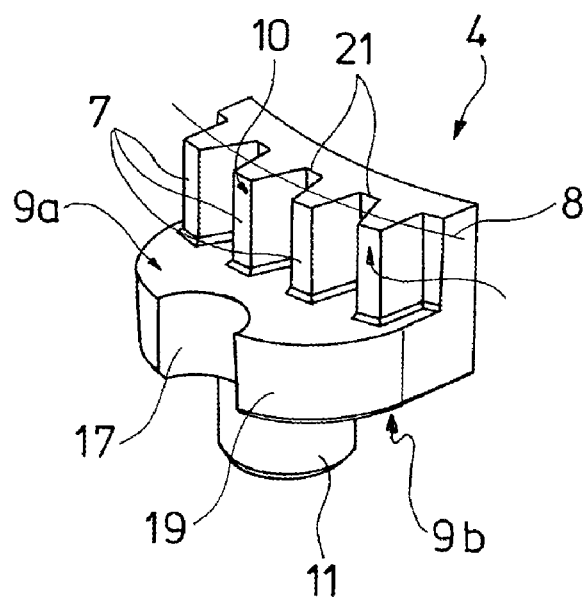

The output flange 3 is shown in FIG. 3 with a top view onto its facial area 15 at the side of the gear housing with two tooth segments 4 according to the invention assembled therein, with such a gear segment 4 being shown in FIG. 4.

The output flange 3 comprises at its facial side 15 an annular shoulder 13, circumferential in reference to its central bore 18, which forms groove 14 extending in the radial direction, diametrically opposite thereto, which each ending with a semicircular extending facial side and in this end section respectively forming a recess 6 to accept a tooth segment 4.

The tooth segment 4 comprises a plate-shaped tooth segment body 5 with a first and a second primary area 9a and 9b. A tooth support 8, carrying the teeth 7, is formed at the first primary area 9a at the edge such that the facial area 10 of the teeth 7 are aligned perpendicular in reference to this first primary area 9a.

The width of the groove 14 is adjusted to the width of the tooth segment body 4 in the tangential direction and the tooth support 8 is shaped arc-like such that its radius is equivalent to the radius of the annular shoulder 13. The recess 6 and/or the groove 14 are arranged such that in the state in which the tooth segment 4 is inserted into said groove 14, the tooth base 21 of the teeth 7 is aligned to the shoulder 13.

The facial area 19 (see FIG. 4) of the tooth segment body 5 opposite the tooth support 8 is embodied semi-circular according to the semi-circularly extending facial side of the groove 14. On the second primary area 9b opposite the first primary area 9a, a pin 11 is formed extending perpendicularly thereto, which when the tooth segment 4 is inserted into the groove 14 is guided into a bore 12 provided in the base of the groove. The pin 11 serves not only as an assembly aid, but primarily prevents the segment from any radial movement out of the sprocket, because by the distortion forces and the thread angle of the toothing a radially acting force component acts upon the tooth segment, which attempts to push the segment out of the annulus toothing.

Therefore the tooth segment 4 comprises a contour by which it can be inserted into the end section of the groove 14 in a form-fitting and precisely matching fashion, as clearly discernible from the cross-section according to FIG. 2 and the perspective illustration according to FIG. 3. This way, the tooth segment 4 is connected to the output flange 3 in a form-fitting fashion.

After the insertion of the tooth segments 4 into the output flange 3 it is assembled to the gear housing 1 with the sprocket 2, by the edge of the gear housing 1 being placed upon the shoulder 13 and via the threaded bores 16 a screw-connection is formed in the output flange 3 and the penetrating bores 20 in the gear housing 1. In this condition the teeth 7 of the tooth segment 4 engage the sprocket 2 of the gear housing 1 so that the output flange 3 and the gear housing 1 cannot distort in reference to each other.

Figure 6:
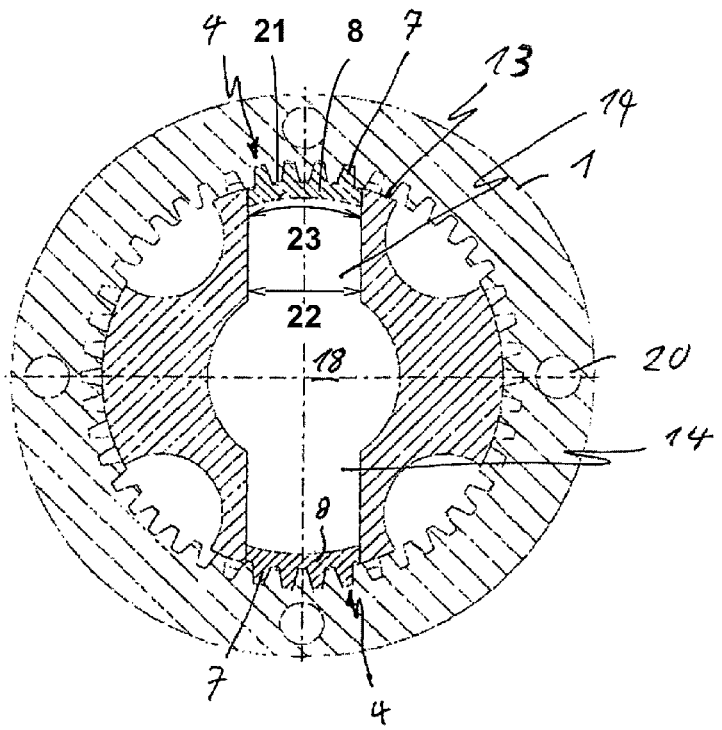
Figure 7:
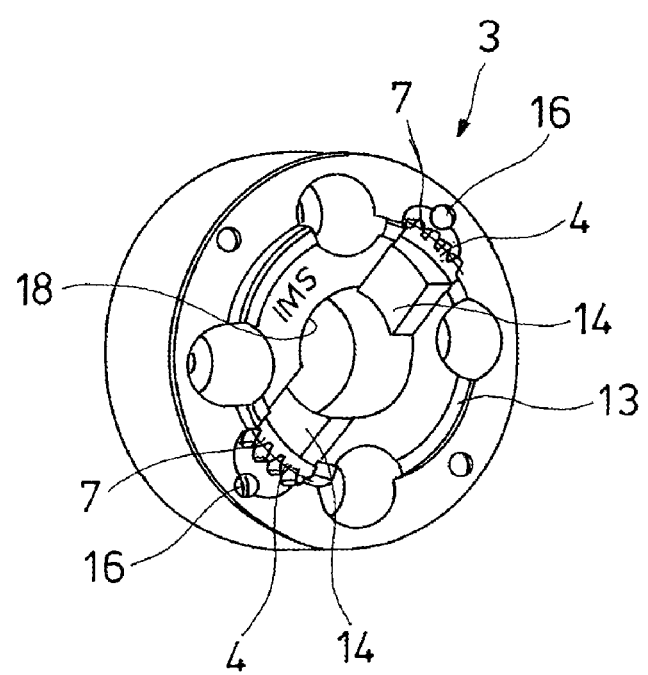

FIGS. 5 and 6 show respectively in a cross-section a gear housing 1 comprising a sprocket 2 connected to an engine flange 3. FIG. 7 shows the engine flange 3 in a perspective top view.

This engine flange 3 is equipped with a tooth segment 4 according to FIG. 4, which is also assembled in the output flange 3 according to FIGS. 1, 2, and 3.

In the same manner as the output flange 3 according to FIG. 3, the engine flange 3 also shows an annular shoulder 13 circulating a central opening 18, which shows a groove 14 extending radially with semi-circular end sections to form one recess 6 each to accept a tooth segment 4 in a form-fitting fashion. In the cross-section according to FIG. 6 it is particularly well discernible that the shoulder 13 contacts the annular facial area of the toothing 2 and the tooth base 21 of the teeth 7 of the tooth segment 4 is aligned to the shoulder 13, so that this way the teeth 7 engage the sprocket 2.

In order to yield a screw connection between the engine flange 3 and the gear housing 1 the engine flange 3 shows threaded bores 16 and the gear housing 1 shows penetrating bores 20. In the area of the semi-circular facial area 19 of the tooth segment body 5 the threaded bores 16 are inserted into the engine flange 3 such that a partial bore 17 develops in this facial area 19. This way, in the assembled state of the engine flange 3 and the gear housing 1 an additional fixation of the tooth segment 4 is achieved.

The exemplary embodiments show that, for differently embodied bearing flanges respectively identical tooth segments can be used, which thus can be applied universally for different series productions of planetary gears with one or more gear speeds.

Such tooth segments according to the invention may be produced in a sintering method from Sint D30, for example.

Any references cited herein are incorporated herein in their entirety, particularly as they related to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I hereby claim:

1. A planetary gear set having an anti-turn mechanism, comprising a sun gear and at least one planet gear circulating in a gear housing with internal toothing, with the gear housing being connected to at least one bearing flange at an output and/or an input side, and with toothing means being provided for a torque-proof connection to the gear housing, which engage the internal toothing, wherein at least one tooth segment is provided as such toothing means, the tooth segment comprises a tooth segment body, and the bearing flange comprises a recess for a form-fitting acceptance of the tooth segment body, and wherein the bearing flange comprises an annular shoulder at the side of the gear housing, and the tooth segment is arranged in a groove extending radially in the area of the annular shoulder with a groove width adjusted to an arc length of the tooth segment such that the shoulder is aligned to a tooth base of the teeth of the tooth segment.

2. The planetary gear set of claim 1, further comprising wherein the tooth segment is embodied with an arc-shaped tooth carrier supporting the teeth of the tooth segment.

3. The planetary gear set of claim 2, further comprising wherein the tooth segment body is arc-shaped in the radial direction with a first and second primary area, with the tooth carrier being arranged on the first primary area with a facial area of the tooth segment extending perpendicularly in reference thereto.

4. The planetary gear set of claim 3, further comprising wherein the second primary area of the tooth segment body comprises a pin formed thereon, which is accepted by a bore arranged in the bearing flange.

5. The planetary gear set according to claim 1, further comprising wherein the groove forms the recess for the tooth segment and the groove comprises a depth such that a first primary area of the tooth segment body is aligned to a facial area of the bearing flange at the side of the gear housing.

6. The planetary gear set of claim 1, further comprising wherein a threaded bore is inserted into the bearing flange in which can be positioned to overlap a partial bore in the tooth segment body.

7. The planetary gear set of claim 1, further comprising wherein two diametrically opposite tooth segments are arranged on the bearing flange.

* * * * *

UNITED STATES PATENT AND TRADEMARK OFFICE
CERTIFICATE OF CORRECTION

PATENT NO.         : 8,998,769 B2
APPLICATION NO.    : 13/697260
DATED              : April 7, 2015
INVENTOR(S)        : Heinz Gert Hagedorn It is certified that error appears in the above-identified patent and that said Letters Patent is hereby corrected as shown below:

On the Title page of the Letters Patent, item (75) Inventor, delete the "Hagerdorn" and replace with --Hagedorn--.

Signed and Sealed this
Twenty-first Day of July, 2015

Michelle K. Lee
*Director of the United States Patent and Trademark Office*